A. G. HOLMES.
WET GAS METER.
APPLICATION FILED JUNE 30, 1917.

1,305,800.

Patented June 3, 1919.

INVENTOR.
Abram G. Holmes
BY
ATTORNEYS.

UNITED STATES PATENT OFFICE.

ABRAM G. HOLMES, OF PITTSBURGH, PENNSYLVANIA.

WET-GAS METER.

1,305,800.  Specification of Letters Patent.  Patented June 3, 1919.

Application filed June 30, 1917. Serial No. 177,880.

*To all whom it may concern:*

Be it known that I, ABRAM G. HOLMES, a citizen of the United States, and a resident of Pittsburgh, in the county of Allegheny and State of Pennsylvania, have made a new and useful Invention in Wet-Gas Meters, of which the following is a specification.

This invention relates to wet gas meters and has for an object to produce new and improved means for lubricating the universal joint and for disposing of excess liquid which may be delivered to or which may collect within the sealing chamber of the meter. This, and other objects which will be made apparent throughout the further description of the invention, are attained by means of apparatus embodying the features herein described and illustrated.

Figure 1:
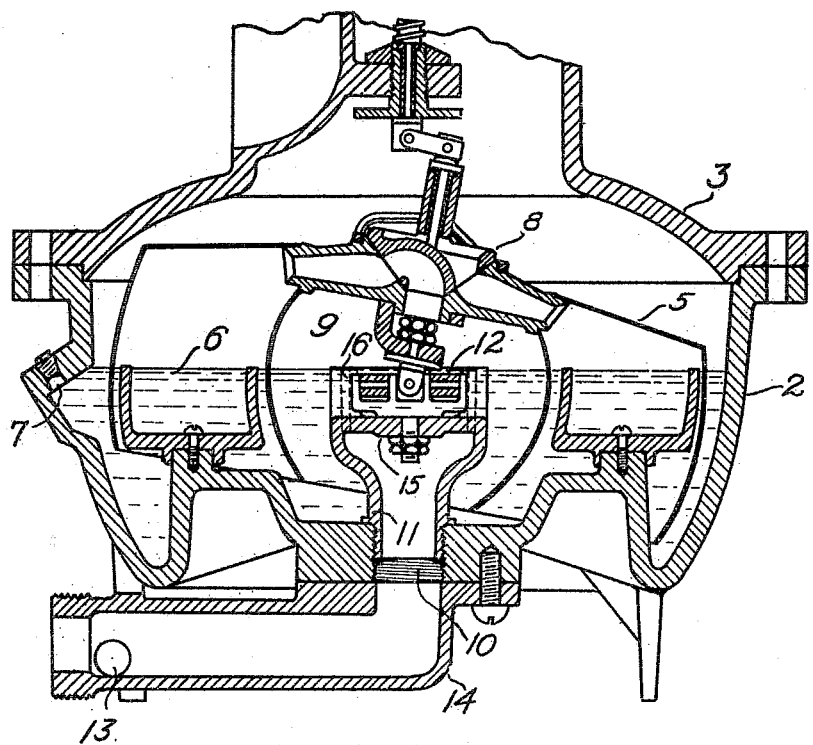
Figure 2:
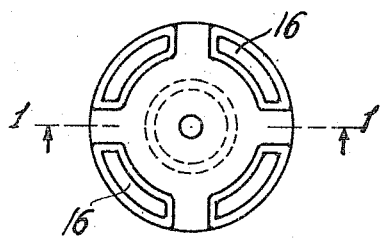

In the drawings accompanying and forming a part hereof, Figure 1 is a fragmental sectional view of a wet gas meter embodying my invention. Fig. 2 is a plan view of a pedestal forming a detail of the present invention.

One of the difficulties with wet gas meters is that the accuracy of the meter is impaired by variations in the level of the sealing liquid within the sealing chamber. These variations may be occasioned by overfilling the sealing chamber or by the fact that liquid is carried by the gas into the gas distributing chamber and consequently into the liquid seal chamber of the meter. In either case, the variations in the level of the sealing liquid occasion variations in the volumetric capacity of the measuring chambers of the meter drum and consequently detrimentally affect the accuracy of the meter.

In overcoming these difficulties, I provide a liquid overflow for the meter which is so located with relation to the sealing chamber of the meter that excess liquid in the chamber will be delivered to a discharge port from which it may be withdrawn.

Referring to the drawings: The meter illustrated includes a casing 2 which is provided with a top cover 3 which may inclose the register mechanism of the meter. The casing 2 incloses the measuring drum 5 of the meter and also forms a receptacle for the sealing liquid 6. As illustrated, sealing liquid may be introduced into the meter through an aperture 7 after the cover 3 is in place.

In the type of meter illustrated the gas outlet or delivery port is formed within the cover 3 and a valve 8, mounted on the drum 5, successively places the measuring chambers of the drum in communication with the gas delivery port. This valve also operates to successively place the measuring chambers of the drum in communication with a distributing chamber 9 which is formed within the drum. The inlet port 10 of the meter is formed within the casing 2 and, as shown, is located at or near the bottom of the sealing liquid chamber within the casing. In order that gas may be delivered upwardly through the sealing liquid chamber and into the gas distributing chamber, I have provided a hollow pedestal 11, which, in effect, forms an inwardly projecting extension of the port 10 and extends upwardly through the sealing liquid terminating in the distributing chamber 9 of the drum. Pedestals of this general design are well known and it is also well known to mount the universal joint 12 of the meter drum on the pedestal. I am personally aware of the fact that these pedestals have been so formed as to permit sealing liquid from the sealing chamber to surround and lubricate the universal joint. In carrying out my invention I not only permit the sealing liquid 6 to surround and lubricate the universal joint, but I so form the pedestal that any excess liquid within the sealing chamber will overflow the bounding walls of the gas delivery passage and will flow downwardly through the gas inlet passage to a liquid discharge port 13. In the illustrated embodiment I have formed the discharge port 13 in the exterior extension 14 of the gas inlet passage, which is preferably permanently secured to the meter casing 2. The port 13 is preferably located at the lowest point within the gas passages of the meter and may communicate with a reservoir or any suitable receptacle for collecting liquid from which the liquid may be removed without interfering with the operation of the meter. In the illustrated embodiment of the invention the pedestal is of such length that its upper end terminates at or near the desired level of the sealing liquid. With this arrangement any excess liquid delivered to the sealing chamber will be discharged through the gas inlet passage of the meter and out through the port 13.

As shown in Fig. 2 the pedestal is so arranged that the universal joint is submerged by sealing liquid. This is accomplished by providing upwardly extending gas passages 16 around the portion 15 of the pedestal which forms a bearing support for the universal joint and by providing a liquid passage between gas passages, which places the bearing support in open communication with the body of sealing liquid 6.

While I have described and illustrated but one modification of my invention, it will be apparent to those skilled in the art that various changes, modifications, additions, and omissions may be made in the apparatus illustrated and described without departing from the spirit and scope of the invention as set forth by the appended claim.

What I claim is:

In combination in a wet gas meter, a measuring drum located in the liquid seal chamber of the said meter and provided with a universal bearing, a pedestal provided with a seat for the bearing adapted to support the bearing beneath the normal level of the sealing liquid in the said chamber and provided with a gas passage communicating with the gas inlet and terminating in a plurality of spaced nozzles surrounding the bearing and projecting upwardly through the liquid and opening into the measuring drum at the normal level of the liquid, whereby gas may be delivered therethrough to the interior of the drum and liquid drained therethrough when the quantity becomes excessive, the said nozzles being so spaced that liquid is free to pass between them to the said bearing.

In testimony whereof, I have hereunto subscribed my name this 28th day of June, 1917.

ABRAM G. HOLMES.

Witnesses:
C. W. McGHEE,
E. W. McCALLISTER.

Copies of this patent may be obtained for five cents each, by addressing the "Commissioner of Patents, Washington, D. C."